Nov. 16, 1965   G. W. HEALY ETAL   3,218,050
ELECTRIC FURNACE
Filed March 5, 1963
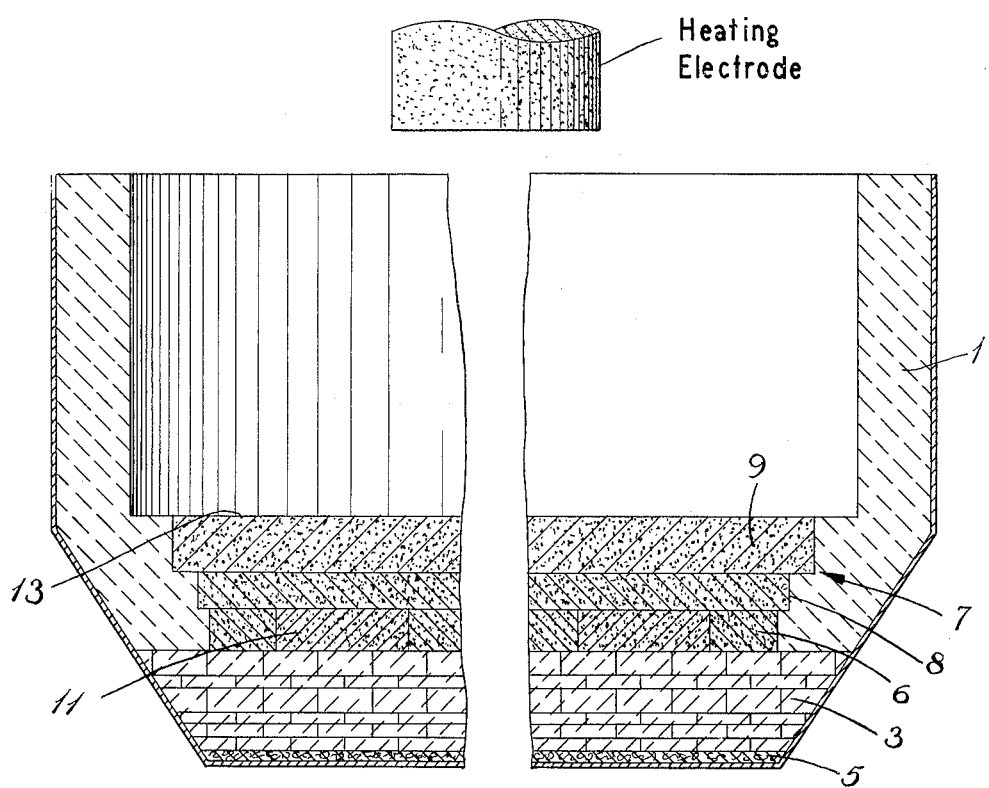
INVENTORS
GEORGE W. HEALY
CHARLES W. KOTHEN
BY
ATTORNEY

United States Patent Office

3,218,050
Patented Nov. 16, 1965

3,218,050
ELECTRIC FURNACE
George W. Healy, Sanborn, and Charles W. Kothen, Buffalo, N.Y., assignors to Union Carbide Corporation, a corporation of New York
Filed Mar. 5, 1963, Ser. No. 263,037
2 Claims. (Cl. 263—46)

The present invention relates to an improved electric furnace. More particularly, the present invention relates to an electric furnace in which the temperature can be controlled to position and maintain the hearth line at a predetermined level.

In the electric furnace smelting of ores with carbon, the metallic values of which have a strong tendency to form high melting-point carbides, such as silicon, calcium, titanium, and the like, it is common for a hearth of these carbides to build up on the floor of the furnace. This situation usually occurs even though the stoichiometry of the charge is balanced for the reduction of ore to metal.

Such a build-up has a number of serious disadvantages. For example, the effective size of the furnace is materially reduced and it ultimately becomes necessary to raise the height of the tapping hole. Since the crucible is, in effect, moved upward toward the heat source, the charge becomes hotter and volatilization and heat losses increase materially. Also, the furnace stoichiometry is invariably disturbed and the recovery of valuable product is decreased.

The temperature at the upper surface of the hearth build-up corresponds to the liquidus-solidus temperature of the particular system being smelted, i.e. the liquidus-solidus temperature of the alloy being produced and the carbides of the ore constituents.

The usual temperature is isotherm at the level of the furnace bottom is considerably below the aforesaid liquidus-solidus temperature and consequently hearth build-up results. It is highly desirable therefore that the liquidus-solidus temperature be positioned at the level of the upper surface of the furnace bottom so that hearth build-up can be avoided.

Attempts have been made to achieve this condition by increasing the power input. While somewhat effective, it is not a completely satisfactory solution since heat losses inevitably increase, and much of the extra energy is wasted.

Thickening the refractory base of the furnace to cause a higher temperature at the furnace bottom by installation of additional insulating brick requires a substantial increase in the height of the furnace structure and therefore of the building housing the furnace, which is a very expensive expedient. Extending the bottom below ground level for the same purpose is unsafe because of the possibility of water seepage into the brickwork.

In furnaces used for the processes under consideration, the inner bottom is usually carbon, backed by insulating firebrick. In such structures, a major consideration is the temperature at the carbon-firebrick interface. This must not reach the value at which the carbon and oxides of the bricks react chemically. In a conventional design, the expedient of raising the temperature at the inner surface of the carbon bottom would, therefore, require a thicker carbon layer in order to maintain the same, safe temperature at the carbon-brick interface. This further increases the cost and the height of the furnace and building structures.

It is therefore an object of this invention to provide a furnace structure in which the temperature at the bottom of the furnace can be raised to a desired value without requiring any significant increase in furnace height or loss in furnace capacity.

It is another object of the present invention to provide a furnace structure in which the furnace bottom is at the level of the solidus-liquidus isotherm of the alloy-carbide system being treated in the furnace.

Other objects will be apparent from the following description and claims taken in conjunction with the drawing in which the sole figure shows a furnace structure in accordance with the present invention.

An electric furnace structure in accordance with the present invention comprises a refractory shell having a refractory base; relatively narrow carbon piers arranged on the refractory base; a carbon hearth supported on the carbon piers and forming compartments therebelow defined by the refractory base, the carbon piers and said carbon hearth; the compartments being substantially filled with finely divided carbon.

With reference to the drawing, the figure shows a conventional hearth structure having a shell 1 and a base 3 formed of suitable refractory bricks. The base rests on a layer of crushed firebrick 5. In accordance with the present invention, a series of piers 6 formed of carbon blocks is arranged on the base 3 of the furnace, replacing a portion of the constituent refractory bricks and/or a portion of the usual carbon hearth. The number and size of the piers is chosen to provide support for the superimposed carbon hearth 7 and to provide compartments 11 defined by the piers, the superimposed hearth and the refractory furnace base. The carbon hearth is prepared from carbon paste or carbon blocks in the usual manner and the usual thickness for the furnace involved, temporary support being provided between the piers as required. In the drawing, the carbon blocks are indicated as 8 and the carbon paste hearth material is indicated as 9.

The compartments 11 act as thermal barriers and the result is a substantial increase in temperature at the level of the furnace bottom 13 without the requirement for any significant increase in the height or thickness of the carbon hearth 7. In general, an increase in the volume of the compartments provides an increase in temperature at the upper surface of the carbon hearth. To reduce gas convection in the compartments and to avoid oxidation of the furnace structure, the compartments 11 are substantially filled with comminuted carbon. The grain size of the carbon should not exceed about 1/4 inch.

In a particular embodiment of the present invention used in conjunction with conventional electric smelting furnace structures, the height of the superimposed carbon hearth and the height of the refractory base are substantially the same and the height of the carbon piers is about 1/3 the height of the carbon hearth. The volume of the compartments is about 1.5 to 2.5 times the volume of the piers.

With a structure as aforedescribed, the heat losses through the bottom of the furnace are greatly reduced so that the hearth temperature is increased without any of the penalties previously mentioned.

In order that the effectiveness of this invention may be more clearly understood, the following comparative examples are given.

*Example 1*

In a commercial electric furnace used for the production of calcium-silicon alloy, the overall height was 11'7" and the base (1'9" high) was constructed of tile layers of refractory brick supported on a two-inch layer of crushed firebrick. Over this was placed a hearth of baked carbon blocks and carbon paste to a thickness of 2'2". The inner cross-section of the furnace at the level of the carbon hearth was about 25 ft. x 25 ft. The total vertical thickness of the hearth and refractory base was four feet one inch. The thickness of the furnace shell, i.e. the side walls, was about 2 feet.

The furnace was operated for the production of calcium-silicon alloys at a power input of 10,700 kw. and at the end of 28 weeks of operation, it was necessary to raise the taphole due to the formation of a carbide hearth, and after the 32nd week of operation, it was necessary to discontinue production of calcium-silicon because a proper crucible size could no longer be maintained.

*Example II*

Using the principles of the invention in a furnace of the same overall height and cross-section, 8-in. high by 16-in. wide baked carbon stringers, spaced on 4-foot centers were set on a firebrick base and extended the length of the furnace. The firebrick base was formed of 2″ of crushed firebrick and 2′ of tile layers of refractory bricks. The space between the stringers was completely filled with carbon powder having a particle size of ¼ in. by ⅛ in. Over the stringers was placed a carbon block hearth having a thickness of two feet two inches as in the previous example. The total thickness of the hearth and refractory base was five feet.

This furnace was operated at an average power input of 11,200 kw. to manufacture calcium-silicon alloy. The furnace was operated for 38 weeks without hearth build-up at the end of which time it was in excellent condition. Adjustments in the taphole positions were not at any time necessary to compensate for changes in hearth position.

The furnace was changed over to another product after a run of 38 weeks when the desired amount of alloy had been produced.

What is claimed is:

1. An electric furnace structure comprising a refractory shell having a refractory base; relatively narrow carbon piers arranged on said refractory base; a carbon hearth supported on said carbon piers and forming compartments therebelow defined by said refractory base, said carbon piers and said carbon hearth; said compartments being substantially filled with fine divided carbon in comminued form without binder.

2. A furnace in accordance with claim 1 wherein the refractory base and the carbon hearth have substantially the same vertical thickness, and the height of the carbon piers is about ⅓ the height of the carbon hearth, the total volume of the compartments being about 1.5 to 2.5 times the total volume of the carbon piers.

References Cited by the Examiner
UNITED STATES PATENTS

| | | | |
|---|---|---|---|
| 842,099 | 1/1907 | Landis | 13—35 |
| 1,674,947 | 6/1928 | Bunce et al. | 266—43 |
| 1,940,115 | 12/1933 | Broadwell | 13—35 |
| 2,567,007 | 9/1951 | Brassert et al. | 266—43 |

CHARLES SUKALO, *Primary Examiner.*